Sept. 2, 1924.  
T. A. SMITH  
MEAT CUTTING MACHINE  
Filed Aug. 20, 1923  
1,507,259  
4 Sheets-Sheet 4

INVENTOR  
THOMAS A. SMITH

Patented Sept. 2, 1924.

1,507,259

UNITED STATES PATENT OFFICE.

THOMAS A. SMITH, OF AUSTIN, MINNESOTA, ASSIGNOR TO GEORGE A. HORMEL & COMPANY, OF AUSTIN, MINNESOTA, A CORPORATION OF MINNESOTA.

MEAT-CUTTING MACHINE.

Application filed August 20, 1923. Serial No. 658,340.

*To all whom it may concern:*

Be it known that I, THOMAS A. SMITH, a citizen of the United States, residing at Austin, in the county of Mower and State of Minnesota, have invented certain new and useful Improvements in Meat-Cutting Machines, of which the following is a specification.

This invention relates to improvements in machines particularly adapted for use in packing plants, for cutting beef and pork into proper shape for packing, and more particularly relates to such machines adapted for use in severing the front shoulders and rear hams from the longitudinally severed sections or sides of a hog.

At present, the front shoulders and hams are manually severed by means of a heavy knife or cleaver. To efficiently and accurately wield such a cleaver requires considerable skill and experience, as the cut must be in a definite place relative to the major portion of the hog section and must also be substantially in a vertical plane. It also requires considerable endurance on the part of the operator, which will be readily understood when it is learned that some packing plants average between five and ten thousand hogs killed per day. It is therefore necessary that a number of men be employed to do this work, usually working in short shifts, one at a time that they may not become fatigued and thus become inaccurate in handling the cleaver. The cleaver must also be wielded with sufficient strength to completely sever either the shoulder or ham with each stroke thereof. This is necessary to make a smooth cut and to avoid loss of time.

By the employment of the novel meat-cutting machine featured in this invention, the shoulders and hams may be quickly and accurately severed from the side without loss of time. The machine is operable by one man thereby dispensing with the employment of several men heretofore engaged for that purpose and greatly decreasing the cost of cutting the meat.

The particular object of this invention, therefore, is to provide an improved meat-cutting machine.

Other objects of the invention will more fully appear from the following description and the accompanying drawings, and will be pointed out in the annexed claims.

In the drawings, there has been disclosed a structure designed to carry out the objects of the invention, but it is to be understood that the invention is not confined to the exact features shown, as various changes may be made within the scope of the claims which follow.

In the accompanying drawings forming part of this specification,

Figure 1:
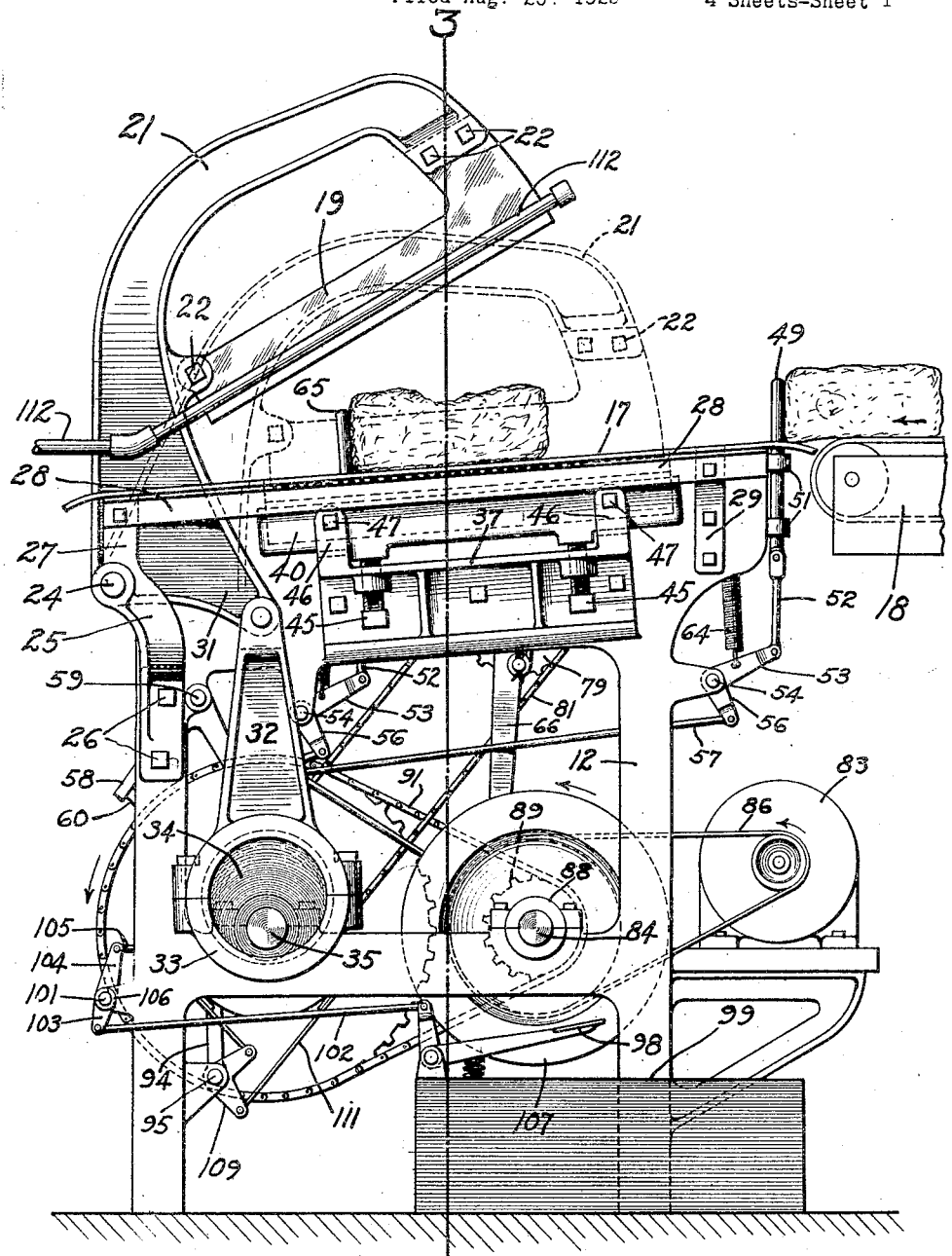
Figure 1 is a view in side elevation of the improved meat-cutting machine, showing the two positions of the knife, and the means provided for operating it.

In the selected embodiment of the invention here shown, there is illustrated a meat-cutting machine having a frame consisting preferably of side members 11 and 12, preferably of cast metal, connected together at their upper portions by means of suitable cross members 13 and 14, and at their lower portions by similar cross members 15 and 16. An inclined top plate 17 is secured to the upper inclined surfaces of the two side members 11 and 12, arranged to cover the entire upper portion of the machine and to function as a cutting table, adapted to receive the meat from a conveyor 18, of ordinary construction, as indicated in Figure 1.

Figure 2:
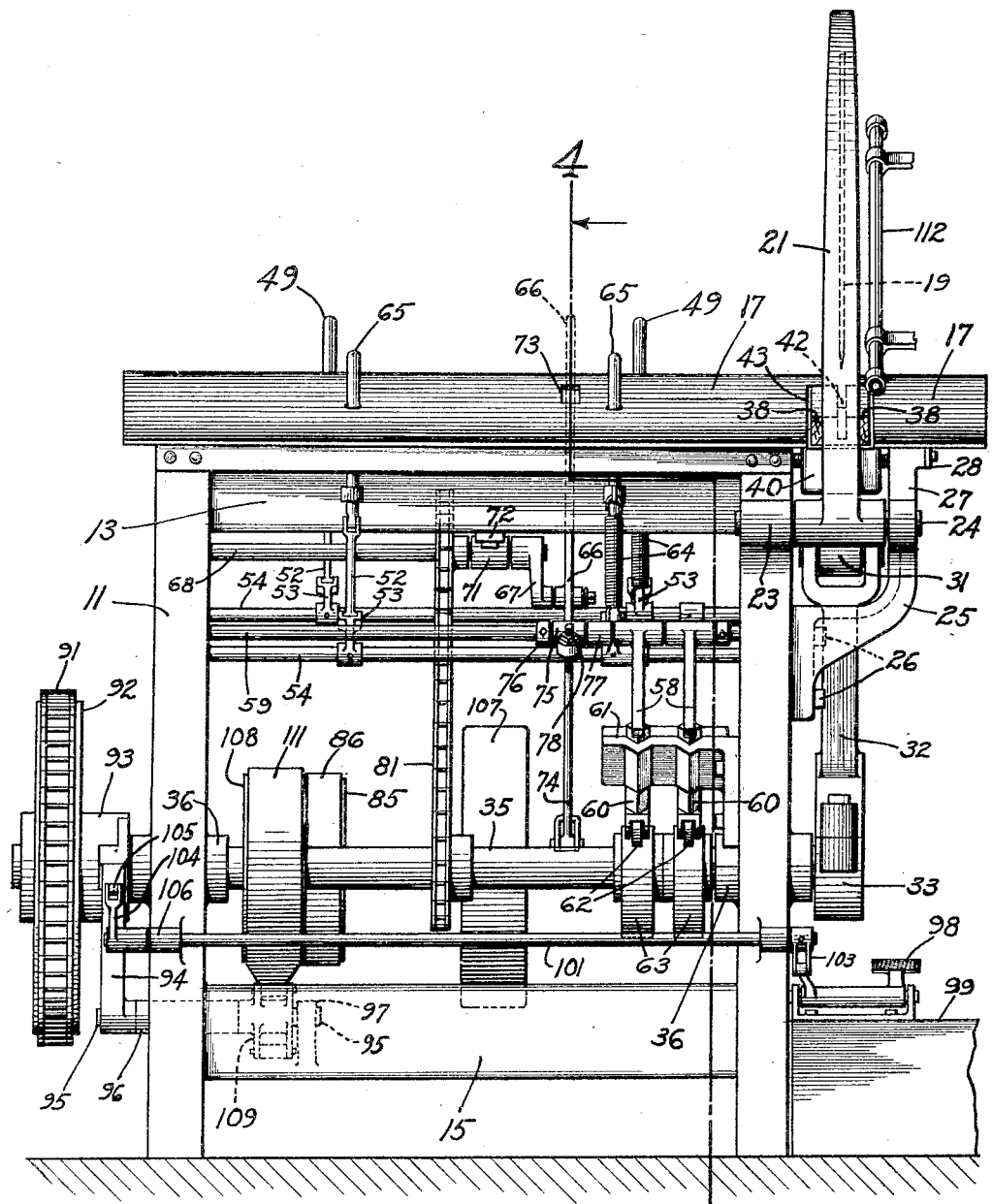
Figure 2 is a view in rear elevation of Figure 1.

The means provided for cutting the meat consists of an elongated knife-blade 19, removably mounted upon a suitable knife arm 21 and secured thereto by means of bolts 22. As shown in Figure 2, an integral boss 23 is provided upon the upper portion of the side member 12 of the frame, adapted to support one end of a pivot pin 24 upon which the knife arm 21 is mounted. The other end of the pin 24 is preferably supported by means of a bracket 25, secured to the outer face of the side member 12 by suitable means, such as bolts 26. An upwardly extending integral lug 27 is preferably provided upon the upper portion of the bracket 25, adapted to support one end of an angle bar 28, which has its other end similarly supported by the side member 12, by means of a bracket 29, secured thereto. The purpose of the angle bar 28 is to provide a support for the overhanging end of the top plate 17, as clearly shown in Figures 2 and 3. An integral extension 31 is preferably provided upon the lower portion of the knife arm 21, adapted to receive the upper end of a suitable pitman or connecting rod 32. The lower end of this connecting rod is preferably provided with a capped bearing 33 adapted to receive an eccentric 34 secured to the terminal end of an operating shaft 35, which is rotatably mounted in suitable bearings 36 provided in the frame members 11 and 12. Thus, when the shaft 35 and eccentric 34 are rotated, an oscillating movement will be imparted to the knife arm 21 and the knife blade 19, as indicated by full and dotted lines in Figure 1.

Figure 3:
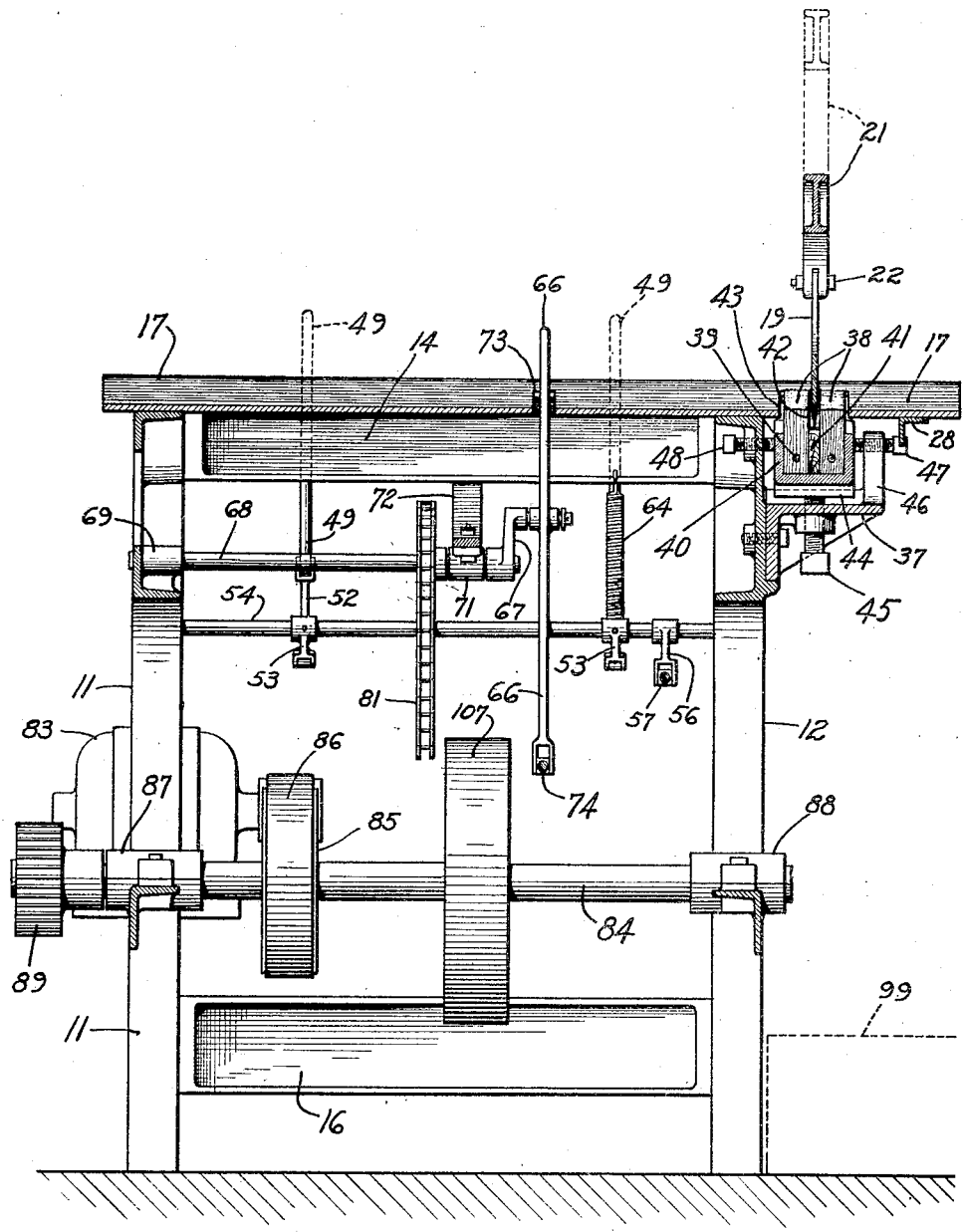
Figure 3 is a cross-sectional view on the line 3—3 of Figures 1 and 4 showing the means provided for supporting the removable knife block upon the machine frame.

As particularly shown in Figure 3, a complementary knife block is removably and adjustably mounted upon a suitable bracket 37, directly beneath the knife blade 19, adapted to cooperate with the knife to sever the meat when placed thereon. This knife block preferably consists of a plurality of wooden blocks 38 preferably secured together by suitable tie-bolts 39 and arranged in a container or supporting member 40 in such manner as to present the grain thereof endwise to the knife, as clearly shown in Figure 5. The blocks 38 are also preferably arranged in two groups, such groups being separated from each other by a suitable spacing strip 41, in order to provide a groove 42, therebetween to receive the cutting edge of the knife when at the bottom of its stroke, as indicated by dotted lines in Figure 1 and full lines in Figure 2. Thus, it will be seen that the cutting edge of the knife does not contact with the knife block and also that it passes below the top surface thereof, thereby providing a cutting mechanism which will positively cut entirely through the meat at each stroke of the knife. It will also be noted that the upper portions of the blocks 38 project through an opening 43 provided in the top plate 17 and that the top surface thereof is preferably flush with the top surface of the plate 17, thus allowing the meat to pass over the knife block without interference therewith.

Figure 5:
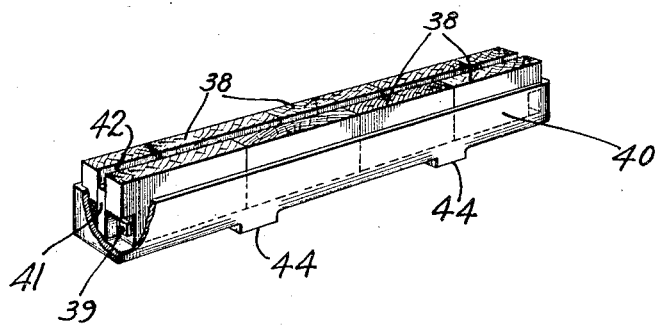
Figure 5 is a perspective view of the knife block removed from the machine.

It is also desirable that means be provided whereby the knife block may be adjusted relative to the cutting edge of the knife for the purpose of aligning the groove 42 therewith. As shown in Figures 1, 3 and 5, bosses 44 are preferably provided upon the bottom of the container 40, adapted to engage the terminal ends of a pair of adjusting screws 45, mounted in the bracket 37, for the purpose of vertically adjusting the knife block relative to the top surface of the plate 17.

Integral lugs 46 are preferably provided upon the bracket 37 and project upwardly therefrom to support a pair of adjusting screws 47, adapted to bear against the outer side of the container 40. Similar adjusting screws 48 are mounted in the web of the side member 12 in alignment with the screws 47, adapted to bear against the inner side of the container to securely retain it in adjusted position. Thus, it will be clearly seen that the knife block may be readily and quickly adjusted relative to the cutting edge of the knife and, when desired, may also be completely removed from the machine, as shown in Figure 5.

Figure 4:
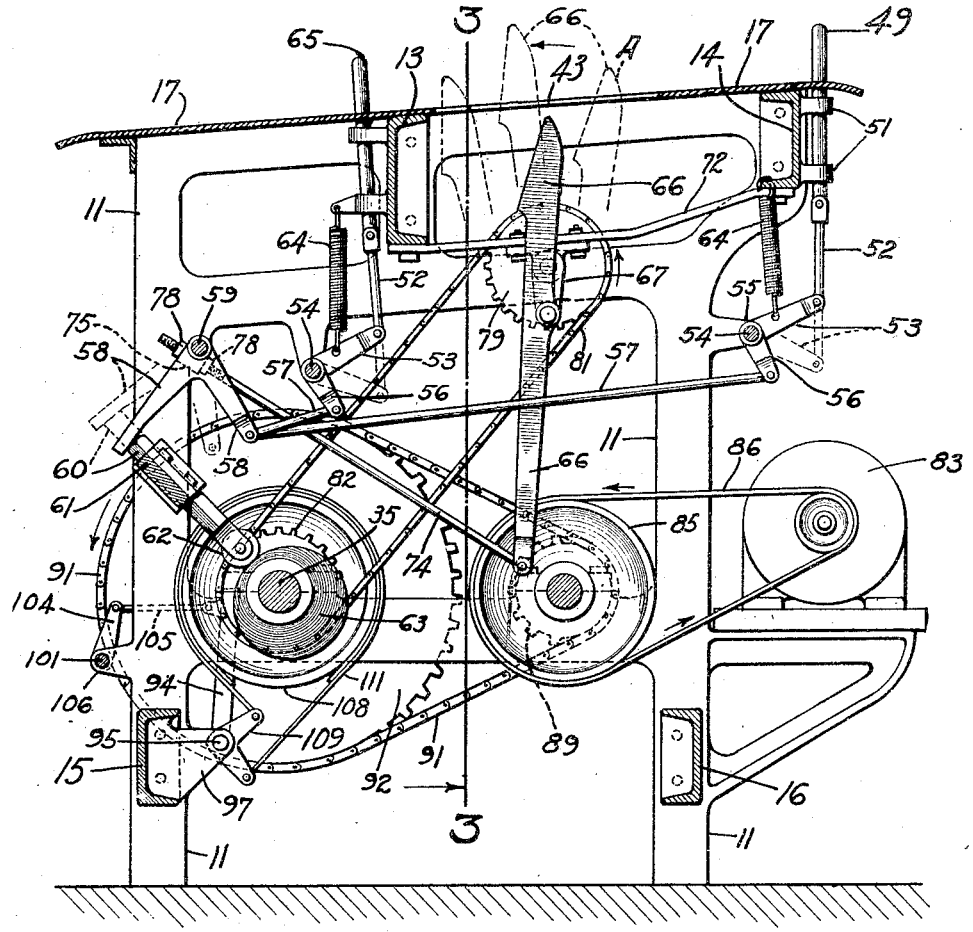
Figure 4 is a vertical sectional view on the line 4—4 of Figure 2, showing the means provided for ejecting the meat from the machine after it has been cut.

Means are preferably provided in the construction of this novel meat-cutting machine whereby the meat to be cut can only be delivered onto the top plate 17, one piece at a time, thus eliminating any danger of the meat becoming congested upon the top plate 17, which might interfere with the successful operation of the knife (see Figure 1). Such means consist preferably in a pair of reciprocally mounted stop pins 49 adjacent the forward or receiving edge of the top plate 17. As shown in Figure 4, the stop pins 49 are vertically guided by means of apertured lugs 51, preferably integrally formed on the outer face of the cross member 14. Connecting links 52 have their upper ends pivotally connected to the lower terminal ends of the stop pins 49, while their lower ends are similarly connected to a pair of forked arms 53 secured to a shaft 54, loosely mounted in bearings 55 provided in the frame members 11 and 12. As shown in Figure 4, a depending arm 56 is secured to the shaft 54 adjacent the frame member 12, having a connecting rod 57 pivotally connected to the lower end thereof. The other end of this connecting rod is similarly connected to one arm of a suitable bell-crank 58, loosely mounted upon a rod 59 having its ends suitably secured to the side members 11 and 12 of the frame. The other arm of the bell-crank 58 is adapted to be engaged by a plunger or push-rod 60 slidably mounted in a capped bracket 61, secured to the frame member 12 for the purpose of actuating the stop pins 49. An antifriction roller 62 is preferably provided at the lower end of the push-rod 59, adapted to ride upon the peripheral surface of an eccentric cam 63, mounted upon the operating shaft 35 in alignment with the push-rod 59. The bell-crank 58 is yieldingly held against the end of the push-rod by means of a tension spring 64, having one end connected to one of the forked arms 53 and its other end connected to the cross member 14 of the frame, thereby also yieldingly retaining the stop pins 49 in raised or normal position.

As shown in Figure 1, similar stop pins 65 are mounted in the cross member 13 adjacent the central portion of the top plate 17, adapted to arrest the movement of the meat after it has been delivered onto the inclined top plate 17 from the conveyor 18. The action and construction of the operating mechanism for the stop pins 65 is identical to that of the stop pins 49 provided at the forward end of the machine, and like parts will therefore be represented by like numerals in the drawings. In the drawings the two cams 63 are shown mounted upon the operating shaft 35 in such manner as to cause the stop pins 49 and 65 to be actuated simultaneously at each revolution of the shaft. It is to be understood, however, that the position of the cams upon the shaft may be changed relatively so as to cause the stop pins to be actuated alternately or to be timed to best suit the operation of the machine.

Means are also provided for ejecting or removing the meat from the central portion of the top plate 17 after it has been severed or cut. An ejector arm 66 is mounted upon a crank-arm 67 secured to one end of a shaft 68 which is rotatably mounted in bearings 69 and 71. As shown in Figure 3, the bearing 69 is preferably integrally formed in the frame member 11 and the bearing 71 is preferably supported by means of a bar 72 secured to the cross members 13 and 14, adjacent the central portion of the machine. An elongated opening 73 is provided in the top plate 17 through which the upper portion of the ejector arm projects when at the height of its stroke, as indicated by full lines in Figure 3 and dotted lines in Figures 2 and 4. The lower terminal end of the ejector arm 66 is pivotally connected to one end of a rod 74 having its other end adjustably mounted in a block 75, loosely mounted upon the rod 59 between suitable collars 76 and 77. As shown, the end of the rod 74 is preferably threaded and provided with nuts 78 by means of which it may be secured to the block 75 in adjusted position; the block being apertured to permit the threaded end of the rod 74, to slide therein when being adjusted. The purpose of arcuately guiding the lower end of the ejector arm, as above described, is primarily to impart to the upper end thereof, an irregular or kicking motion, i. e., as it enters the opening 73, as shown at A in Figure 4, the forward movement thereof will be comparatively slow, caused by the motion of the crank arm 67 and the arcuate movement of the lower end of the ejector arm, thereby causing the ejector arm to engage the meat with a very slight impact, and thus relieve the operating mechanism from the shock and strain which would otherwise occur. As the upper end of the ejector arm continues its forward movement, the speed thereof will be rapidly increased, causing the meat to be ejected from the machine; it being understood that the stop pins 65 are so timed relative to the ejector arm 66 that they will be depressed or in lowermost position during the forward movement of the upper portion of the ejector arm. A sprocket 79 is preferably mounted upon the shaft 68 adjacent the bearing 71, adapted to cooperate with a chain 81 and a similar sprocket 82 mounted upon the shaft 35 to rotate the ejector arm shaft 68.

The driving means provided for operating the machine consists preferably of a motor 83, mounted adjacent the forward or receiving side of the machine, adapted to transmit power to a counter drive shaft 84 by means of a pulley 85 and flexible belt 86. The drive shaft 84 is supported in capped bearings 87 and 88 preferably integrally formed in the side members 11 and 12 of the frame, as shown in Figure 3. A sprocket 89 is secured to one end of the drive shaft 84 adapted to cooperate with a flexible belt 91 to transmit rotary motion to a clutch sprocket 92 having a clutch body 93 formed in the hub thereof, as shown in Figure 2. This clutch is of ordinary construction, preferably being of the type commonly employed in punch presses, and it is therefore not necessary to show same in detail. It is well-known in clutches of this type, that the sprocket 92 and clutch body 93 rotate continuously while the machine is in operation. The usual clutch dog 94 is shown mounted on a short shaft 95 which is supported by means of bearings 96 and 97 provided in the side member 11 and cross member 15, respectively, of the frame. The clutch dog 94 is operable by means of a spring retained foot-pedal 98, preferably mounted upon a small platform 99 adjacent one end of the machine where it may be conveniently operated by the machine operator. As shown in Figures 1 and 2, the foot-pedal 98 is preferably connected to a transverse shaft 101 by means of a rod 102 and a depending forked arm 103, the other end of the shaft having an upwardly extending arm 104 secured thereto which is connected to the clutch dog 94 by means of a short connecting rod 105. The shaft 101 is suitably supported in bearings 106, preferably provided in the frame members 11 and 12. A suitable flywheel 107 is also preferably mounted upon the continuously revolving drive shaft 84 to provide sufficient momentum to the moving parts of the machine when in operation, to prevent the motor from being overloaded when the knife blade 19 is being forced through the meat.

It is also desirable that means be provided for positively arresting the movement of the knife operating mechanism each time the starting clutch 93 is released. This may be effectively accomplished by the provision of a suitable friction brake preferably operable in conjunction with the clutch dog 94 and foot-pedal 98. As shown in the drawings, a brake drum 108 is preferably mounted upon the operating shaft 35 adjacent the side member 11 of the frame in alignment with a forked bell-crank 109 secured to the end of the clutch-dog supporting shaft 95. A brake-band 111, of ordinary construction, has its ends connected to the two forked arms of the bell-crank 109 and is arranged to substantially encircle the brake drum 108, as clearly shown in Figure 4. When the clutch dog 94 is in normal position, the brake-band 111 will be in frictional contact with the peripheral surface of the brake drum 108 and thereby positively lock the operating shaft 35 against further movement. As soon as the clutch-dog is released from the clutch by means of the foot-pedal 98, the brake-band 111 will simultaneously be released from frictional contact with the brake drum 108, allowing the operating shaft 35 to be rotated with the clutch, with the resultant actuation of the knife arm 21, stop pins 49 and 65, and the ejector arm 66. As soon as the shaft 35 has made one complete revolution the movement thereof will again be interrupted until the foot-pedal 98 is again manipulated.

When this novel meat-cutting machine is employed in a packing plant for cutting pork and beef received from a cooling room or cold storage, it is desirable that means be provided for keeping the knife blade reasonably warm for the purpose of keeping the blade smooth and clean and to prevent particles of fat and meat from adhering thereto, which would occur if the blade was not heated. Such means may be practically effected by the provision of a steam pipe 112 mounted adjacent the knife blade and arm as shown in Figures 1 and 2. This pipe is provided with a series of small holes on the side adjacent the knife blade, through which steam may be jetted against the blade when in normal position, as shown in Figure 1. The steam pipe is preferably fixedly mounted and may be supplied with steam from any suitable source. Should the knife blade, however, become besmirched or dulled, it may be readily removed from the knife arm by the removal of the bolts 22.

Operation.

In the operation of this novel meat-cutting machine the meat is delivered to the machine by the usual conveyor 18, as shown in Figure 1. The operator, standing upon the elevated platform 99, will cause the machine to be actuated by means of the foot-pedal 98. As the stop pins 49 at the receiving side of the machine are lowered or depressed beneath the surface of the top plate 17 the side will be delivered to the top plate, sliding down the inclined surface thereof until it is brought into contact with the stop pins 65, as shown. The operator will then adjust the meat beneath the knife, and when properly adjusted will manipulate the foot-pedal 98, causing the clutch-dog 94 to actuate the clutch 93, and the shaft 35 to be rotated with the resultant operation of the cutting mechanism. The portion of the meat severed from the major portion of the meat side and left on the overhanging end of the table adjacent the operator, may be delivered into a suitable slide or chute by the operator, while the severed portion remaining upon the top plate 17 will be ejected therefrom by the ejector arm 66.

I claim as my invention:

1. A meat-cutting machine comprising a frame, a table thereon adapted to receive the meat to be cut, an arm mounted to swing in a vertical plane above said table, a knife carried by said arm and having a cutting edge which diverges from the plane of said table whereby the knife will enter the meat at an angle to the surface thereof said table having an opening therein through which the knife blade passes, a fibrous stop beneath said opening to receive the edge of the knife, and mechanism for operating said arm and knife.

2. A meat-cutting machine comprising a frame having a meat-supporting table, an arm pivotally supported at its lower end below said table and projecting above and overhanging said table, a knife blade mounted in said arm and having its cutting edge at an angle to the meat-supporting surface of said table and adapted to swing down through an opening provided in the table top, said arm having an extension at its lower end and an eccentric mechanism connected with said extension for oscillating said arm and knife blade in a vertical plane toward and from said table and through said opening.

3. A meat-cutting machine comprising a frame having a meat-supporting table provided with a knife blade opening, a knife arm and knife blade mounted to swing in a vertical plane above said table, and a fibrous knife block mounted in said frame below said table and adapted to receive the lower edge of said knife when it has passed entirely through the meat and through said opening, and an adjustable support wherein said knife block is mounted.

4. A meat-cutting machine comprising a frame, a meat-supporting table thereon, a knife arm and knife blade carried thereby mounted to swing vertically above said table, a container supported below said table and having means for adjusting it vertically and laterally, a series of wooden blocks mounted in said container and spaced apart to form a longitudinal gap between them, and a wooden strip fitting in the bottom of said gap and with which the knife edge contacts after it has passed through the meat.

5. A meat-cutting machine comprising a frame, a table thereon, a conveyor for delivering the sides or sections of meat to said table, means projecting above said table adjacent to said conveyor to prevent premature delivery of the meat to said table, means projecting above the table near the middle thereof and with which the sections of meat contact during the cutting operation, and mechanism for retracting one projecting means to allow the delivery of the meat to said table, and for retracting the other projecting means to permit the discharge of a section of the meat from the table when the cutting operation is completed.

6. A meat-cutting machine comprising a frame having a meat-supporting table, a conveyor mounted to deliver the sections of meat to said table, pins projecting upwardly through said table adjacent to said conveyor to prevent premature delivery of the sections of meat to said table, a knife arm and knife blade carried thereby mounted to move vertically above said table, and mechanism for retracting said pins to allow delivery of the section of meat to the table and operating said arm and knife blade to cut the meat.

7. A meat-cutting machine comprising a frame having a meat-cutting table, a knife arm and blade mounted to move in a vertical plane above said table, pins projecting above said table and with which the meat is in contact during the cutting operation, mechanism for operating said knife arm and blade to cut the meat, mechanism for withdrawing said pins when the cutting operation is completed, and means operating through said table for ejecting the meat therefrom when the cutting operation is completed.

8. A meat-cutting machine comprising a frame having a meat-cutting table, a knife arm and blade mounted to move in a vertical plane above said table, means projecting above said table and with which the meat is in contact during the cutting operation, mechanism for operating said knife arm and blade to cut the meat, mechanism for retracting said projecting means when the cutting operation is completed, and an ejector arm operating through said table and having a gyrating movement to engage and discharge the meat from the table at the completion of the cutting operation.

9. A meat-cutting machine comprising a frame having a meat-cutting table, means for delivering the side of meat to be cut thereto, a knife arm and blade mounted to move in a vertical plane above said table, and operating through an opening in said table to sever the meat, means adjacent said delivering means for preventing premature delivery of the meat to said table, means projecting above said table for holding the meat in its cutting position, means for ejecting a section of the meat when the cutting operation is completed, and mechanism for operating said delivery preventing, said meat holding and said ejecting means successively.

10. A meat-cutting machine comprising a frame, a meat-supporting table thereon, a conveyor for delivering the sides of meat to be cut to said table, pins projecting above said table adjacent to said conveyor to prevent premature delivery of the meat to said table, pins projecting above said table for contact with the meat during the cutting operation, an ejector arm operating through said table to contact with the meat and discharge it from said table, a knife arm supported above said table to move in a vertical plane, a knife blade carried thereby, mechanism for moving said arm and blade toward and from said table, and mechanism for successively retracting said pins and operating said ejector arm.

11. A meat-cutting machine comprising a frame having a flat inclined top forming a table whereto the meat to be cut is delivered, means adjacent the upper side of said top for delivering the meat thereto, stops projecting through said top and operating to hold the meat thereon during the cutting operation, an arm pivoted in said frame and mounted to swing in a vertical plane above said top, a knife blade carried by said arm and having the limit of its downstroke below the surface of said top whereby a clear cut of the meat is assured, mechanism for oscillating said arm to move said knife blade to its cutting position, and means for retracting said stops to allow the discharge of the meat from said top after the cutting operation.

12. A meat-cutting machine comprising a frame, a table thereon, means for delivering sides of meat to be cut to said table, stops arranged to prevent premature delivery of the meat, stops for holding the meat during the cutting operation, a knife mounted to sever the sides of meat, and mechanism for withdrawing said delivery and holding stops to allow a side of meat to pass onto the table and the severed sections to be discharged therefrom.

13. A meat-cutting machine comprising a frame, a table thereon, means for delivering the sides or sections of meat to said table, means to prevent premature delivery of the meat to said table, means for cutting the meat upon said table, means for holding the meat during the cutting operation, and means for operating said delivery preventing, said holding and said cutting means successively.

14. A meat-cutting machine comprising a frame, a table thereon adapted to receive sides or sections of meat to be cut, stops against which the meat is seated during the cutting operation, a knife mounted to make a shear cut through the meat on said table, and mechanism for withdrawing said stops to allow the discharge of the meat when the cutting operation is completed.

15. A meat-cutting machine comprising a frame, a table thereon adapted to receive sides or sections of meat to be cut, stops against which the meat is seated during the cutting operation, a knife mounted to make a shear cut through the meat on said table, mechanism for withdrawing said stops to allow the discharge of the meat, and means for ejecting the meat from said table when the cutting operation is completed and said stops are withdrawn.

16. A meat-cutting machine comprising a frame, a table therein, means for delivering a side of meat to be cut thereto, means preventing premature delivery of the meat, a meat-cutting knife, means for holding the meat during the cutting operation, and a treadle controlled mechanism for withdrawing said delivery preventing, and said holding means.

17. A meat-cutting machine comprising a frame, a table therein adapted to receive a side or section of meat to be cut, an arm pivoted in said frame below said table and extending upwardly and forwardly over said table, an operating means for said arm having a pivoted connection therewith near its frame pivot for oscillating said arm in a vertical plane, and a knife blade removably mounted in said arm and adapted to pass through the meat on said table.

18. A meat-cutting machine comprising a frame, a meat-supporting table therein, a container supported beneath said table, blocks mounted in said container and having upper surfaces within an opening in said table, and adapted for adjustment therein, said blocks being spaced apart to form a gap between them, and a knife blade mounted for movement above said table and adapted to enter said gap when it has passed completely through the meat on said table.

19. A meat-cutting machine comprising a frame, a meat-supporting table therein provided with an opening, blocks fitting within said opening, and spaced apart to form a gap between them, a support for said blocks beneath said table, a fibrous strip fitting within said gap between said blocks, and a meat-cutting knife mounted for movement above said table and adapted to enter the gap between said blocks and contact with said fibrous strip when it has passed completely through the meat.

20. A meat-cutting machine comprising a frame having a meat-supporting table, means for delivering the sides or section of meat to said table, stops arranged to prevent the premature delivery of the meat to said table, a knife having a movement above said table to sever the sides or sections of meat, and means for successively ejecting the severed sections of meat and withdrawing said stops to permit the delivery of another section to said table.

21. A meat-cutting machine comprising a frame, a table therein, a conveyor for delivering sides of meat to be cut to said table, a knife having a cleaverlike blade mounted above said table and having a shear cut through the meat to sever the sides or sections, mechanism for operating said knife intermittently, and an ejecting device mounted to discharge the severed sections from said table.

22. A machine for cutting sides of beef and pork into shape for packing, comprising a frame, a table mounted therein, means for intermittently delivering a side of meat to said table, a knife having a cleaverlike blade mounted to move toward said table and cut the meat thereon into sections, mechanism for operating said knife intermittently, and an arm having a kicking movement for discharging the cut sections from said table.

In witness whereof, I have hereunto set my hand this 13th day of August, 1923.

THOMAS A. SMITH.